United States Patent
Bhaskaran

[19]

[11] Patent Number: 5,963,540
[45] Date of Patent: Oct. 5, 1999

[54] ROUTER POOLING IN A NETWORK FLOWSWITCH

[75] Inventor: Sajit Bhaskaran, Sunnyvale, Calif.

[73] Assignee: Holontech Corporation, San Jose, Calif.

[21] Appl. No.: 08/994,405

[22] Filed: Dec. 19, 1997

[51] Int. Cl.[6] .................................................. H04L 12/56
[52] U.S. Cl. .............................. 370/218; 370/244; 714/4
[58] Field of Search ..................................... 370/217, 218,
370/219, 242–246, 290, 401, 402; 395/182.01,
182.02; 709/238, 239, 244; 714/4

[56] References Cited

U.S. PATENT DOCUMENTS

| | | | |
|---|---|---|---|
| 5,473,599 | 12/1995 | Li et al. | 370/16 |
| 5,815,668 | 9/1998 | Hashimoto | 395/200.68 |
| 5,835,696 | 11/1998 | Hess | 395/182.08 |

FOREIGN PATENT DOCUMENTS

| | | | |
|---|---|---|---|
| 409321789 | 12/1997 | Japan | H04L 12/46 |

*Primary Examiner*—Melvin Marcelo
*Attorney, Agent, or Firm*—Skjerven, Morrill, MacPherson Franklin and Friel

[57] ABSTRACT

A router fault tolerant network interface system includes a switch circuit configured to detect when a router fails in a multi-router local network. When a failed router is detected, the switch circuit waits for a time-out period to expire to allow convergence. The switch circuit then intervenes when traffic from a server to the failed router is detected. The switch circuit translates the MAC address of the failed router to the MAC address of a functional router. Traffic from a server originally directed to the failed router is then redirected to a functional router. In a further refinement, the switch circuit provides the MAC address of a functional router in response to an ARP request from a server to the failed router. Thus, traffic from this server will be directed to the functional router without further intervention, reducing the overhead of the switch circuit. In still a further refinement, if the failed router recovers, the switch circuit waits for a time-out period to expire to allow convergence of external routers and to allow the recovered router to learn routes to known clients. The switch circuit then ceases all intervention for the MAC address of the now recovered router.

39 Claims, 5 Drawing Sheets

ROUTER POOLING IN A NETWORK FLOWSWITCH

FIELD OF THE INVENTION

The present invention relates to network systems and, more particularly, to router fault tolerance and host-to-router traffic load balancing.

BACKGROUND

Figure 1:
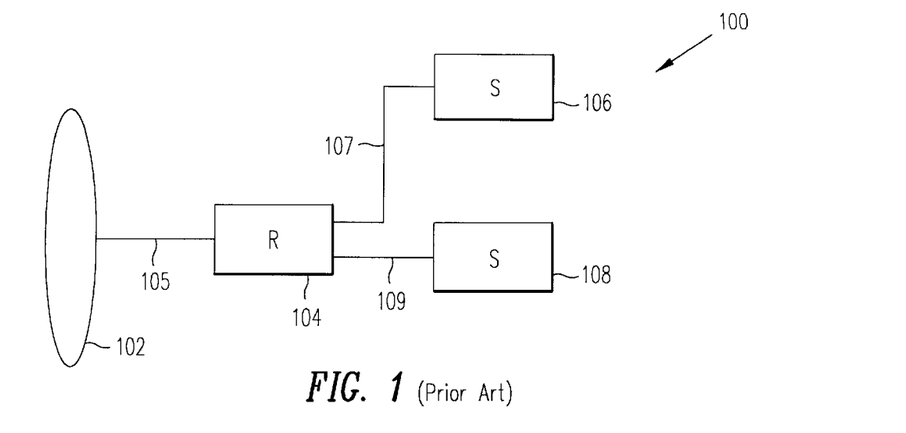
FIG. 1 is a block diagram of a conventional network architecture.

The growth of networking and the popularity of the Internet have created a need to improve the performance and reliability of network architectures. For example, FIG. 1 shows a block diagram of a local network 100 according to a conventional network architecture. Network 100 is connected to a network backbone 102 that connects several external networks. Backbone 102 may be, for example, the Internet or an Intranet. In this example, network 100 includes a router 104 connected to backbone 102 through a interface 105. Network 100 also includes a first server 106 connected to router 104 through a interface 107 and a second server 108 connected to router 104 through a interface 109. In this example, network 100 uses the TCP/IP communication protocols, which are well known in the art of networking.

Clients connected to backbone 102 may send packets to a specific server in network 100 (e.g., server 106) through router 104. Conversely, server 106 may send packets to the client through router 104 and onto backbone 102. However, network 100 is not fault tolerant in that router 104 represents a possible single point failure for network 100. More specifically, when router 104 fails, servers 106 and 108 can no longer communicate with clients connected to backbone 102. In particular, servers are typically not configured to detect failure of "first hop" routers (i.e., the first router encountered by an outbound packet from a server). Thus, the servers will continue to send packets to the failed router, never knowing that the outbound packets do not leave network 100 (sometimes referred to as a "black hole" for outbound traffic).

Figure 2:
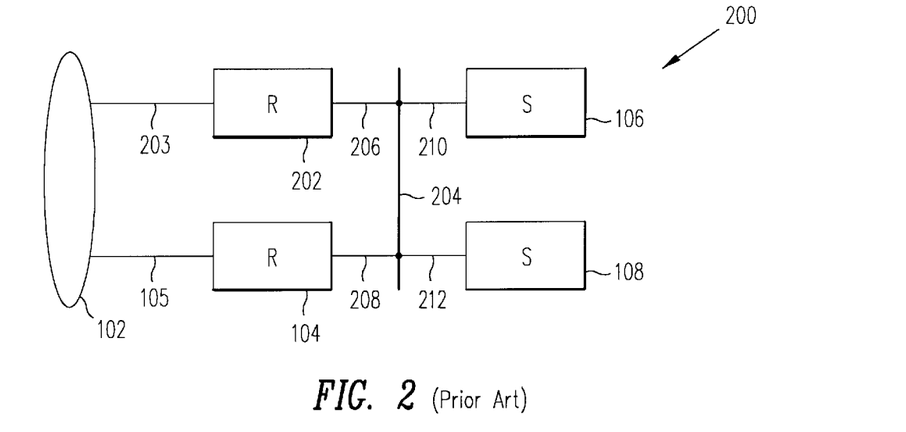
FIG. 2 is a block diagram of a conventional network architecture using a shared media to provide router fault tolerance.

One conventional scheme to eliminate this single point failure is to include a second router in the local network. FIG. 2 shows a block diagram of a network 200 according to such a conventional scheme. In this example, network 200 includes a second router 202 connected to backbone 102 through an interface 203. Routers 202 and 104 are connected to a shared media 204 (e.g., Ethernet cable) through interfaces 206 and 208. Servers 106 and 108 are connected to shared media 204 through interfaces 210 and 212, respectively. Although the second router 202 does provide fault tolerance, the use of shared media 204 undesirably increases the complexity of network 200 and degrades the performance of network 200.

In one implementation of this conventional scheme, fault tolerance is mainly implemented on the servers. In particular, the servers are special servers configured to listen to the router information protocol (RIP) and can detect the failure of a router. Then these servers can adapt to reconfigure themselves to change the default router. However, this scheme places a large burden on the server to listen and process the complete routing table that exists in the network. Consequently, server performance is significantly impacted by this scheme, which, of course, is undesirable. Further, this processing of the RIP information takes on the order of several minutes, which is a relatively long time to correct a router failure. This relatively long correction time undesirably allows a significant number of packets to be sent to the "black hole."

In another scheme that is implemented in the routers as well as in the servers, servers 106 and 108 are configured with a "virtual" Internet protocol (IP) address different from the regular interferace IP addresses of routers 202 and 104. Routers 202 and 104 are configured with a virtual IP address and monitor every packet on shared media 204. Thus, when one router fails, the other router detects this failure and can then handle the packets of the failed router.

Although this virtual IP address scheme may represent an improvement in detection of a failed router over the previously described scheme, several problems remain. For example, this scheme is intrusive in that this scheme requires the use of special routers and specially configured servers that support this virtual address scheme. Thus, this scheme may not be practical for a user already having a significant investment in servers and routers that do not support these virtual address features. In addition, the presence of a third router IP address may confuse the network management system used by the user.

SUMMARY

In accordance with the present invention, a router fault tolerant network system is provided by a network flowswitch. In one embodiment adapted for the TCP/IP standard, the routers are connected to the backbone as in a conventional system. However, the network includes a switch circuit that connects the routers to the servers with a switching mechanism (e.g., switched Ethernet), instead of shared media. In one aspect of the present invention, the use of the switch circuit provides significantly higher bandwidth than the bandwidth of a conventional shared media system. In another aspect of the present invention, the switch circuit does not use a virtual address, thereby simplifying network configuration and network management.

In yet another aspect of the present invention, the switch circuit is configured to provide fault tolerance. In one embodiment, the switch circuit detects failed routers by monitoring Internet Control Message Protocol/Router Discovery Protocol (ICMP RDP) advertisements when the routers support the ICMP RDP. In other embodiments, the switch circuit is configured to send out ARP request packets at user-configured predetermined intervals to check whether the routers are functioning. Alternatively, the switch circuit can be configured to "ping" the routers at user-configured predetermined intervals using the standard ICMP Echo Request feature to check whether the routers are functioning. When the switch circuit detects a failed router, the switch circuit waits for a time out period to expire to help ensure resynchronization of the external routers. The switch circuit is then configured into the intervene mode in which the switch circuit for outbound traffic (i.e., traffic from the servers to clients) responds to traffic having the media access control (MAC) destination address of the failed router. In addition, the switch circuit translates the MAC address of the failed router to the MAC address of a functional router. Consequently, the switch circuit redirects the outbound traffic originally directed to the failed router to the functional router. This intervention and translation is done transparently and non-intrusively to the servers and routers. Thus, there is no need to make non-standard reconfigurations of the servers and routers to be connected to the switch circuit to support this router fault tolerance feature.

In a further aspect of the present invention, when the servers eventually send Address Resolution Protocol (ARP) requests to the failed router (i.e., when the servers' ARP cache timers expire), the switch circuit responds to the ARP request with the MAC address of a functional router instead of the address MAC of the failed router. Because subsequent outbound traffic from the servers will now be automatically directed to the functional router, the switch circuit no longer needs to intervene. Thus, a significant amount of the burden on the switch circuit is eliminated, restoring the switching performance of the switch circuit.

In still another aspect of the present invention, the switch circuit detects if the failed router has recovered. When a recovered router is detected, the switch circuit waits for another time out period to expire to help ensure synchronization of external routers. Then the switch circuit ceases all intervention for the now recovered router. As a result, when the recovery occurs before the ARP cache timers expire, the servers' ARP caches still contain the MAC address of the recovered router. Thus, the switch circuit simply responds to outbound traffic directed to the recovered router in the normal manner. In contrast, when the recovery occurs after the servers' ARP caches have been updated with the MAC address of another router, the servers will continue to direct outbound traffic to this other router until the ARP cache timers expire again so that the servers can be updated with the MAC address of the recovered router. Thus, unlike the aforementioned conventional schemes, a local network according to the present invention provides a relatively fast, high bandwidth and non-intrusive router fault tolerance feature.

DETAILED DESCRIPTION

Figure 3:
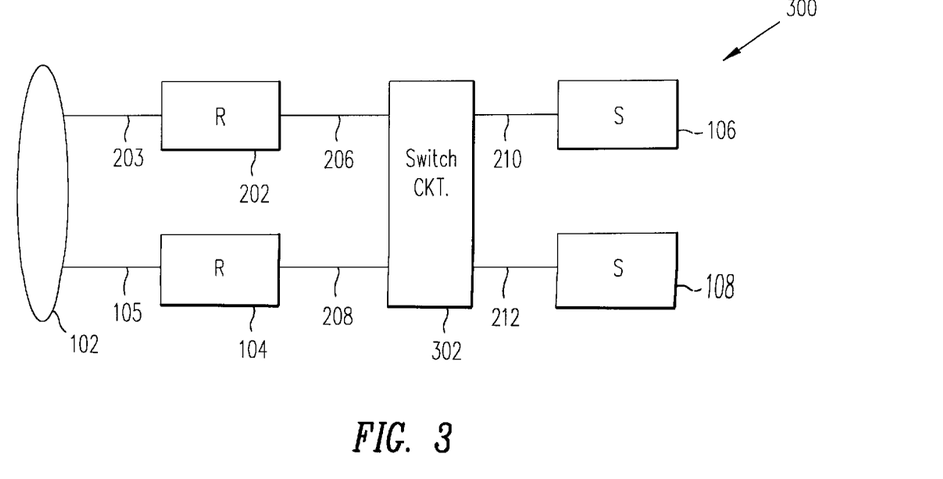
FIG. 3 is a block diagram of a network with a switch circuit for providing router fault tolerance, in accordance with one embodiment of the present invention.

FIG. 3 is a block diagram of a network 300 for providing router fault tolerance, in accordance with one embodiment of the present invention. Network 300 is similar in topography to network 200 (FIG. 2) except that network 300 includes a flowswitch 302 instead of shared media 204 (FIG. 2) of network 200.

In particular, network 300 includes two routers 202 and 104 respectively connected to network backbone 102 through interfaces 203 and 105. Routers 202 and 104 are also connected to flowswitch 302 through interfaces 206 and 208, respectively. Routers 202 and 104 can be of any suitable type of router available from any vendor. In this embodiment, routers 202 and 104 are configured to support the TCP/IP communication protocol. Also, Routers 202 and 104 are configured in the manner standard for the particular router models to provide symmetrical network routing for all routes from the servers to clients (i.e., the routers both have all of the routes for all known clients). In this embodiment, this symmetry is implemented and maintained by providing a link between routers 202 and 104.

Network 300 also includes two servers 106 and 108 respectively connected to flowswitch 302 through interfaces 210 and 302. In this embodiment, servers 106 and 108 are configured to have default routers (i.e., dynamic routing in the servers is disabled) in the standard manner for the particular server models. Similarly, the servers can be of any suitable type, vendor or model that supports TCP/IP and is interoperable with routers 202 and 104.

In addition, although two routers and two servers are shown in this embodiment, other embodiments may use more than two routers and/or a different number of servers and/or different server configurations. For example, a network may have a single physical server that implements several "clusters," with each cluster having a separate server IP address.

In one embodiment, flowswitch 302 is a configurable switch circuit using a single processor connected to four Fast Ethernet Controllers through a PCI Local Bus, as described in co-filed and commonly assigned U.S. patent application Ser. No. 08/994,709 and entitled *"Cross-Platform Server Clustering Using A Network Flowswitch"*, by Sajit Bhaskaran, which is incorporated herein by reference in its entirety. Accordingly, the aforementioned Ser. No. 08/994, 709 application should be referred to for a more detailed description of flowswitch 302. In this embodiment, flowswitch 302 is programmed with software or firmware to provide a router fault tolerant functionality.

In other embodiments, other suitable configurable switch circuits can be used such as, for example, a configurable switch circuit using a crossbar switch. Unlike schemes that use shared media to connect the servers and routers, flowswitch 302 allows for full duplex traffic between more than one pair of server/router connections simultaneously.

Figure 4:
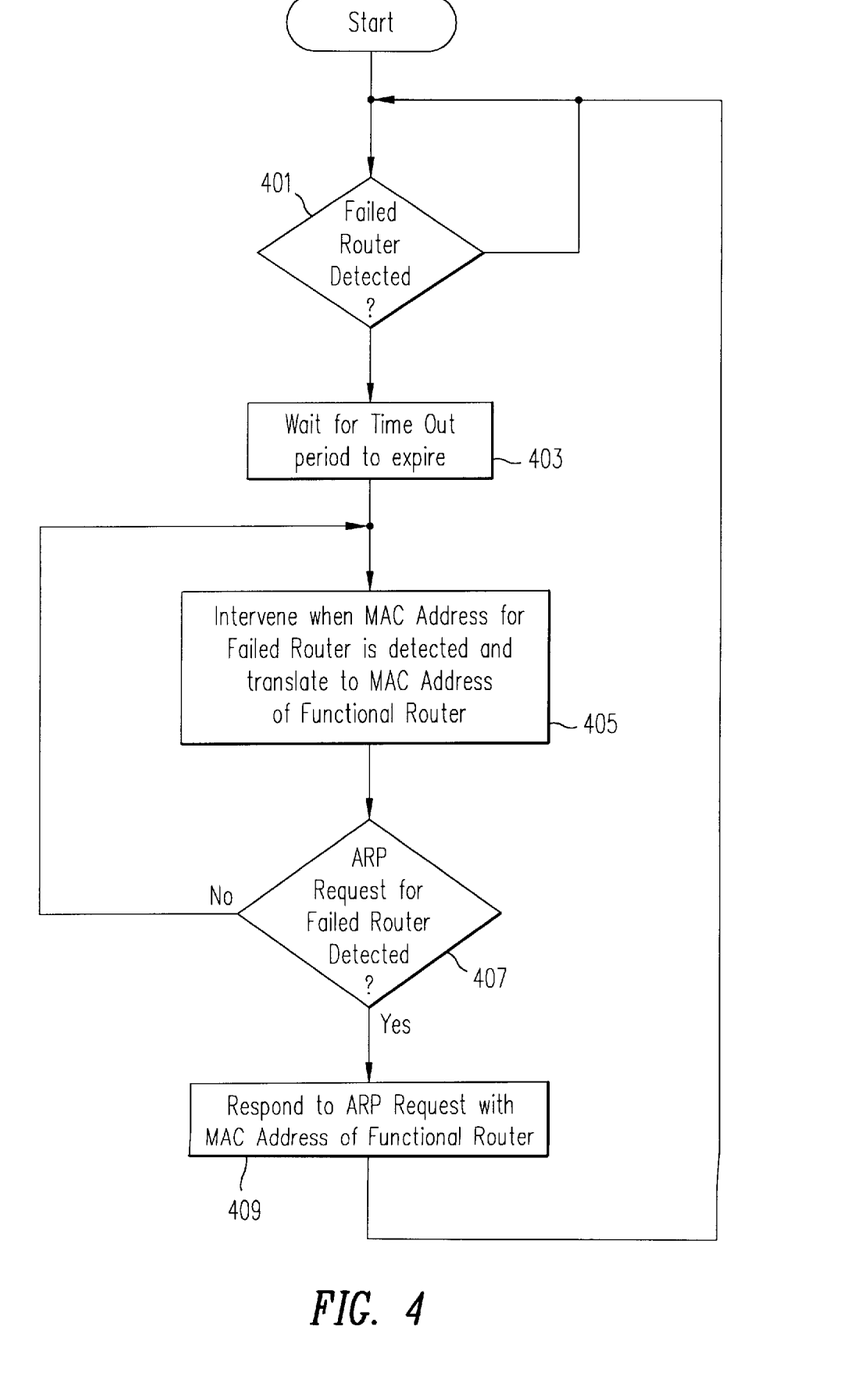
FIG. 4 is a flow diagram illustrative of the operation of the switch circuit of FIG. 3 when a router failure occurs, in accordance with one embodiment of the present invention.

FIG. 4 is a flow diagram illustrative of the operation of flowswitch 302 (FIG. 3) when a router failure occurs, in accordance with one embodiment of the present invention. Referring to FIGS. 3 and 4, network 300 operates as follows to implement a router fault tolerance function.

In a step 401, flowswitch 302 monitors the status of routers 202 and 104. In one embodiment adapted for use with routers supporting the aforementioned ICMP RDP feature, flowswitch 302 is configured to monitor the ICMP RDP advertisements sent out by routers 202 and 104. As is well known in the art of networking, routers supporting the ICMP RDP feature can be configured to send advertisements at predetermined intervals. When a router fails, the failed router will no longer send out these advertisements. If flowswitch 302 does not detect an advertisement from a router within the known interval, a router failure is indicated.

In an alternative embodiment, flowswitch 302 is configured to probe routers 202 and 104 at user-configured predetermined intervals using the standard ARP Request feature of the TCP/IP to check whether the routers are functioning.

Routers that support TCP/IP typically also support this ARP request feature. In this embodiment, flowswitch 302 detects that a router has failed when the router fails a user-configured predetermined number (e.g., three) of consecutive ARP requests. Similarly, flowswitch 302 detects that a failed router has recovered when a router correctly responds to a user-configured predetermined number of consecutive ARP requests (described below in conjunction with FIG. 5). The router status is "pending" when a router fails a single ARP request (and is "failed" if the router fails the next two ARP requests).

In another alternative embodiment, flowswitch 302 is configured to "ping" routers 202 and 104 at predetermined intervals using the standard ICMP Echo Request feature of the TCP/IP to check whether the routers are functioning. Currently available routers that support TCP/IP typically also support the ICMP echo request feature. As in the previously described embodiment, flowswitch 302 detects that a router has failed when the router fails a user-configured predetermined number of consecutive pings. Similarly, flowswitch 302 detects that a failed router has recovered when a router correctly responds to a user-configured predetermined number of consecutive pings. The router status is "pending" when a router fails a single ping (and is "failed" if the router fails the next two pings).

In yet another alternative, flowswitch 302 may listen passively to OSPF (open shortest path first) "Hello" packets sent by the routers in the network 300. The OSPF "Hello" packets are typically supported in routers that support the TCP/IP. In this embodiment, flowswitch 302 is configured to dynamically learn the interval between successive "Hello" packets for each router in network 300. When flowswitch 302 fails to receive at least one "Hello" packet from a particular router during the learnt interval, failure of that router is indicated.

If no failed router is detected, flowswitch 302 loops back to perform step 401 to monitor the status of routers 202 and 104 (e.g., by listening for the ICMP RDP advertisements or by probing the routers with ARP Requests, etc.). However, if a failed router is detected, flowswitch 302 performs a step 405.

In step 405, flowswitch 302 monitors outbound traffic from the servers to the failed router. Flowswitch 302 then switches to a functional router all outbound traffic originally directed to the failed router. In particular for this embodiment, flowswitch 302 effects this switchover by intervening. As used herein in this context, intervening refers to monitoring the outbound packet traffic to detect packets having the MAC address of the failed router and then translating the MAC address of the failed router to the MAC address of a functional router. Thus, for example, if flowswitch 302 detects a packet from server 106 with the MAC address of the failed router (say router 202 in this example), flowswitch 302 translates or rewrites the MAC address of failed router 202 to the MAC address of functioning router 104 before relaying the packet to router 104. Further, in accordance with the present invention, the users are to always configure the routers to automatically learn routes to all known clients. Consequently, because routers 202 and 104 have routes to all known clients, router 104 can properly send the packet to the addressed client. Flowswitch 302 then provides a high bandwidth full duplex connection between the server 106 and router 104 as described in the aforementioned Ser. No. 08/994,709 application. Of course, the traffic from the two servers 106 and 108 is now directed to the single router 104, resulting in a degraded total bandwidth of network 300. However, the degraded bandwidth still supports full duplex, which in effect provides greater bandwidth than the aforementioned conventional schemes that use a shared media.

In a step 407, flowswitch 302 monitors the outbound traffic for address resolution protocol (ARP) requests sent by servers 106 and 108 to the failed router. If no ARP request for the failed router is detected, assuming the failed router has not recovered, flowswitch 302 loops back to the step 405. Thus, if the duration of the failure to this point is less than the ARP cache timers in the servers, flowswitch 302 must continue to intervene and translate for the failed router.

However, when an ARP request for the failed router is detected, flowswitch 302 proxies the ARP request for the failed router. More specifically, flowswitch 302 replies to the ARP request from the servers using the MAC address of the functional router instead of the MAC address of the failed router. As a result, the servers will send any subsequent packets to the functional router without any additional intervention from flowswitch 302 (i.e., in the standard manner described in the aforementioned Ser. No. 08/994, 709 application). This switchover to the functional router is transparent and non-intrusive to servers 106 and 108. As long as the failed router remains in a failed condition, flowswitch 302 will continue to proxy subsequent ARP requests in this manner for the failed router. This feature reduces the processing burden on flowswitch 302.

Figure 5:
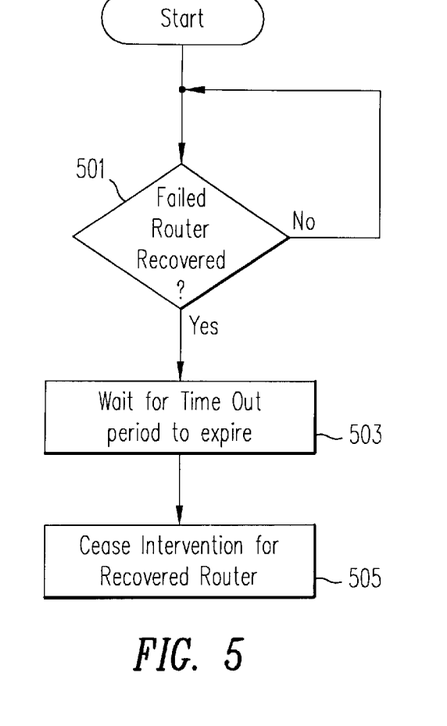
FIG. 5 is a flow diagram illustrative of the switch circuit of FIG. 3 when a failed router recovers, in accordance with one embodiment of the present invention.

FIG. 5 is a flow diagram illustrative of the operation of flowswitch 302 (FIG. 3) when a failed router recovers, in accordance with one embodiment of the present invention. Referring to FIGS. 3 and 5, flowswitch 302 operates as follows to implement a router recovery function.

In a step 501, flowswitch 302 monitors the router traffic to detect whether a failed router has recovered. For example, when routers 104 and 202 support the ICMP RDP feature, a newly recovered router will again begin sending advertisements at the known interval. Thus, a newly recovered router is detected when flowswitch 302 detects advertisements from the "failed" router. When the routers do not support the ICMP RDP feature, flowswitch 302 can be configured to probe the routers (including the failed router) with either ARP requests or ping the routers with ICMP echo requests. When a "failed" router properly replies to a probe or ping, flowswitch 302 changes the status of the router to "pending". Then if this router properly responds to a user-configured predetermined number of consecutive probes or pings (e.g., three), flowswitch 302 changes the status of the router to "good" or functional.

After a recovered router is detected, in a step 503, flowswitch 302 is configured to wait for a MIN-RECOVER-TIME period to expire before ending the intervention and translation for the newly recovered router. This time out period allows the recovered router to learn all of the routes in the network and the external routers to resynchronize their routing databases before traffic is switched-over to the recovered router. The MIN-RECOVER-TIME period can range from one second to several seconds, depending on the router network topology and design. In this manner, flowswitch 302 allows for a smooth, non-intrusive transition to the restored multi-router configuration.

Then in a step 505, flowswitch 302 ceases to intervene and translate the MAC addresses for the newly recovered router. If the recovery occurs before an ARP request updates the router MAC addresses in the servers, the servers still have the MAC address of the recovered router. Consequently, outbound traffic directed to the recovered server will automatically be properly routed to the recovered router. However, if the recovery occurs after the router MAC addresses have been updated through an ARP request, then the servers have the MAC address of the other router instead of the recovered router. In this case, outbound traffic will continue to be directed to the other router until a next ARP request occurs, which will update or refresh the servers with the MAC address of the recovered router. Subsequent outbound traffic will then be directed to the recovered router in the normal manner.

Alternatively, when the recovery occurs after the router MAC addresses have been refreshed, the switch circuit may be configured to cease intervention after a subsequent ARP request causes all of the servers to be refreshed with the MAC address of the recovered router.

Table 1 below lists pseudocode implementing the flow diagram of FIG. 5, according to one embodiment of the present invention.

TABLE 1

Router Fault Tolerance (RFT)

```
router_isOperUp (router r0)
{
    if (r0->state is operationally up)
        return TRUE
    else
        return FALSE
}
router_isOperDown (router r0)
{
    if (r0->state is operationally down)
        return TRUE
    else
        return FALSE
}
/* A router that was up went down */
router_setOperDown (router r0)
{
    if (router_isOperDown (r0))
        return
    if (r0->pool)
    {
        /* r0 is NOT in any router pool */
        return
    }
    set r0 operationally down
    if (r0->pool->backup EQUAL r0)
    {
        /* Backup router for pool went down */
        set r0->pool->backup to NONE
    }
    if (r0->pool->backup is NONE)
    {
        /* NO backup router selected.
        Select backup router now. */
        set r0->pool->backup to first
        operationally up router in pool
    }
    if (r0->pool->backup is NONE)
    {
        /* Failed to find an operational router to backup pool.
        * We have a pool with ALL routers down.
        */
        set r0->pool->need_forward to TRUE
        /* Stop intervening in packet forwarding
        as we have no
        * router to forward to.
        */
        for (each router r1 in r0->pool)
        {
            Configure switch to forward packets
            destined to r1 MAC
            Address to port r1->link
        }
    }
    else
```

TABLE 1-continued

Router Fault Tolerance (RFT)

```
    {
        /* Backup router selected. */
        Configure switch to forward packets destined
        to r0 MAC Address to CPU
    }
}
/* A router that was down went up */
router_setOperUp (router r0)
{
    if (router_isOperUp (r0))
        return
    if(r0->pool is NONE)
        return
    set r0 operationally up
    Configure switch to forward packets destined to r0 MAC Address to
    port r0->link
        if (r0->pool->need_forward is TRUE)
        {
            set r0->pool->forward to r0
            for (each router r1 in r0->pool)
            {
                /* Backup router now available. */
                if (r1 NOT EQUAL r0)
                {
                    Configure switch to forward packets
                    destined to r1 MAC Address to CPU
                }
            }
            set r0->pool->need_forward to FALSE
        }
        else if (there are NO operationally down
        routers in r0->pool)
        {
            set r0->pool->forward to NONE
        }
}
/* Router liveness determination */
Periodically do
{
    for (all pools that are configured)
    {
        for (each router r0 in pool)
        {
            if (detect method is IRDP)
            {
                if ((router_isOperUp (r0)) AND
                (NOT received advertisment))
                {
                    router_setOperDown (r0)
                }
            }
            else if (detect method is ARP)
            {
                if (ARP Request counter GREATER
                THAN bring down value))
                (
                    router-setOperDown (r0)
                }
                Send ARP Request to r0->link
                Increment ARP Request counter
                for r0
            }
        }
    }
}
for (each ARP Reply packet)
{
    if (reply is from router r0)
    {
        if (router_isOperDown (r0))
        (
            Increment ARP Reply counter for r0
            If (ARP Reply counter GREATER THAN
            bring up value)
```

TABLE 1-continued

Router Fault Tolerance (RFT)

```
            {
                set ARP Reply counter for r0
                to 0 (Zero)
                router_setOperUp (r0)
            }
        }
        Set ARP Request counter for r0 to 0 (Zero)
    }
}
for (each IRDP advertisement)
{
        if (advertisement is from router r0)
        {
            if (router_isOperDown (r0))
                router_setOperUp (r0)
            Set advertisement time out for r0
        }
}
```

Figure 6:
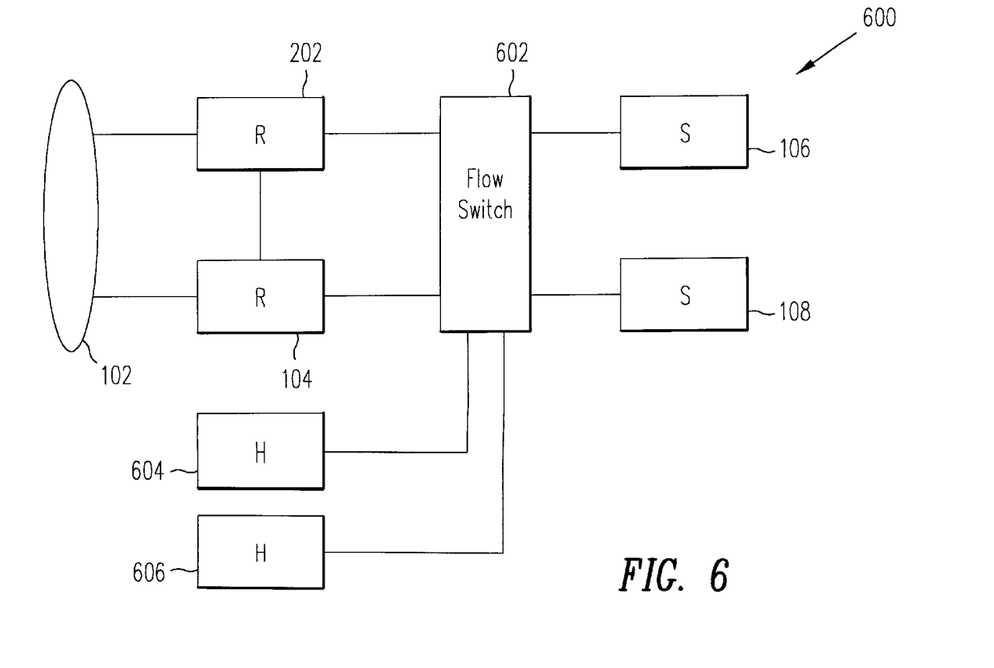
FIG. 6 is a block diagram of a network having a switch circuit for providing router load balancing, in accordance with one embodiment of the present invention.

FIG. 6 is a block diagram illustrative of a server-to-external network 600 (or host-to-router) load balancing network, according to one embodiment of the present invention. Network 600 is similar to network 300 (FIG. 3) except that network 600 includes a flowswitch 602 (instead of flowswitch 302 of FIG. 3) and hosts 604 and 606. Like flowswitch 302, flowswitch 602 is implemented in this embodiment as described in the aforementioned Ser. No. 08/994,709 application and configured with software or firmware implementing the router load balancing functionality. In other embodiments, flowswitch 602 may be connected to more than two routers and/or a different number of servers and hosts.

In this embodiment, flowswitch 602 includes the router fault tolerance functionality of flowswitch 302 (FIG. 3), as well as a router load balancing functionality. The router load balancing function is accomplished through a "proxy ARP" technique described below in conjunction with FIG. 7. In other embodiments, flowswitch 602 need not include the router fault tolerance functionality of flowswitch 302 (FIG. 3).

Figure 7:
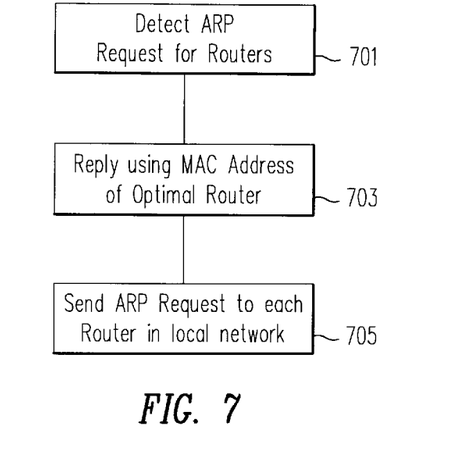
FIG. 7 is a flow diagram illustrative of the operation of the switch circuit of FIG. 6 to balance router loads, in accordance with one embodiment of the present invention.

FIG. 7 is a flow diagram illustrative of the router load balancing operation performed by flowswitch 602 (FIG. 6). Referring to FIGS. 6 and 7, the router load balancing is performed as follows. The flowswitch 602 is configured to perform a step 701 in which flowswitch 602 detects ARP requests to either of routers 202 or 104 from servers 106 and 108 and hosts 604 and 606. Then in a step 703, flowswitch 602 responds to the detected ARP request with the MAC address of an "optimal" router (either router 104 or 202).

In the first embodiment, the load towards the routers is balanced by maintaining a list of servers' that are actively issuing ARP Requests, and allocating router MAC addresses in the flowswitch originated Proxy ARP replies to the servers, this allocation being done in strict round robin fashion.

In another embodiment, the load towards the routers is balanced by maintaining a list of servers' that are actively issuing ARP Requests, and allocating router MAC addresses in the flowswitch originated Proxy ARP replies to the servers, this allocation being done in accordance with an end user specified weight distribution (e.g., if these are 40% and 60% for routers 104 and 202 then 40% of servers are allocated to 104 and 60% to 202 respectively)

If any router in a pool of N routers fails, the load previously allocated to the failed router is divided evenly among the remaining N−1 routers, over a period of several server ARP refresh events. Initially, router fault tolerance occurs, where a backup router is selected and all traffic addressed to the failed router goes only to the backup (i.e., functional) router. This may result in temporary uneven distribution of server-to-router traffic. On each server ARP refresh however, the flow switch can control its proxy ARP replies so that this uneven distribution is gradually corrected, the distribution becoming even when all servers have completed their ARP refreshes.

For example, server 106 may send an ARP request to router 104 by using the "broadcast" MAC address and the IP address for router 104, which is detected in step 701. Without flowswitch 602, router 104 would ordinarily respond to this ARP request with a reply packet containing the MAC address of router 104. However, in accordance with the present invention, in step 703, flowswitch 602 replies to the ARP request with the MAC address of the optimal router (e.g., router 202). Thus, in effect, flowswitch 602 has redirected future traffic (from the servers and hosts to the less-optimal router 104) to the more-optimal router 202. Because flowswitch 602 responds to ARP requests to each router instead of the intended router (i.e., by "proxy") with the MAC address of the "optimal" router, router load-sharing is transparently implemented with respect to the servers, thereby simplifying the servers' (and hosts') routing configuration. In a further refinement, the servers and hosts may be configured with a single default router, with flowswitch 602 directing server/host-to-router traffic to the "optimal" router. In addition, this scheme also simplifies the process of adding an additional router or routers in that the servers' routing configurations need not be changed. Thus, the servers need not even be aware of the IP addresses of the added router or routers.

In addition, this router load balancing scheme is periodically adjusted (i.e., with each ARP refresh) to reflect the changing loading conditions of the routers. More specifically, because ARP refresh intervals typically range from about one to thirty minutes, the router load balancing function will be updated about every one to thirty minutes to track changes in the router loading.

In a step 705, flowswitch 602 sends out an ARP request to each router (i.e., to routers 202 and 104 in this embodiment). These ARP requests contain the original server IP addresses with the MAC address of flowswitch 602. Consequently, each router responds by sending an ARP request reply containing its MAC address. By performing step 705, flowswitch 602 proactively refreshes the routers' ARP caches with each server's IP address.

Table 2 below lists pseudocode implementing the flow diagram of FIG. 7, according to one embodiment of the present invention.

TABLE 2

Proxy ARP for RFT and Router Load Balancing (RLB)

```
for (each ARP Request packet)
{
    if ((ARP Request target IP Address is for
        router r0) AND (r0->pool is NOT NONE))
    {
        /* ARP for a router that is in a router
        pool */
        if ((router_isOperDown (r0)) AND
            (r0->pool->forward is NOT NONE)
        {
            Set ARP Reply Source IP Address as r0
            IP Address
```

TABLE 2-continued

```
         Set ARP Reply Source MAC Address as
         r0->pool->forward MAC Address
         send ARP Reply packet on link that the
         request was received
      }
      if (router_isOperUp (r0))
      (
         /* Select a router to use */
         select r1 that results in even load
         distribution, based on either round robin
         which is the default, or user configured
         weighted distribution
         /* The distribution is
         done by maintaining a list of
         servers actively issuing ARP Request
         refresh packets for router IP addresses,
         and allocating routers to these
         servers by allocating MAC addresses of
         the router pool accordingly */
         Set ARP Reply Source IP Address as r0 IP
         Address
         Set ARP Reply Source MAC Address
         as r1 MAC Address
         send ARP Reply packet
         on link that the request was received
      }
      return
   )
Perform normal Proxy ARP function
}
Packet Forwarding for RFT for (each IP Packet)
{
   if (packet is for server)
   {
      Perform Server Load Balancing algorithm
      return
   }
   /* Is RFT Algorithm needed? */
   set r0 to spdb_getRouterByMACAddress
   (packet destination address)
   if ((r0 is NOT NONE) AND
       (r0->pool is NOT NONE) AND
       (r0->pool->forward is NOT NONE))
   {
      /* Do RFT stuff */
      set packet destination MAC Address
      to r0->pool->forward MAC Address
      send packet to port r0->pool->forward->link
      return
   }
   /* NO special handling needed */
   Perform normal packet forwarding. */
}
```

Figure 8:
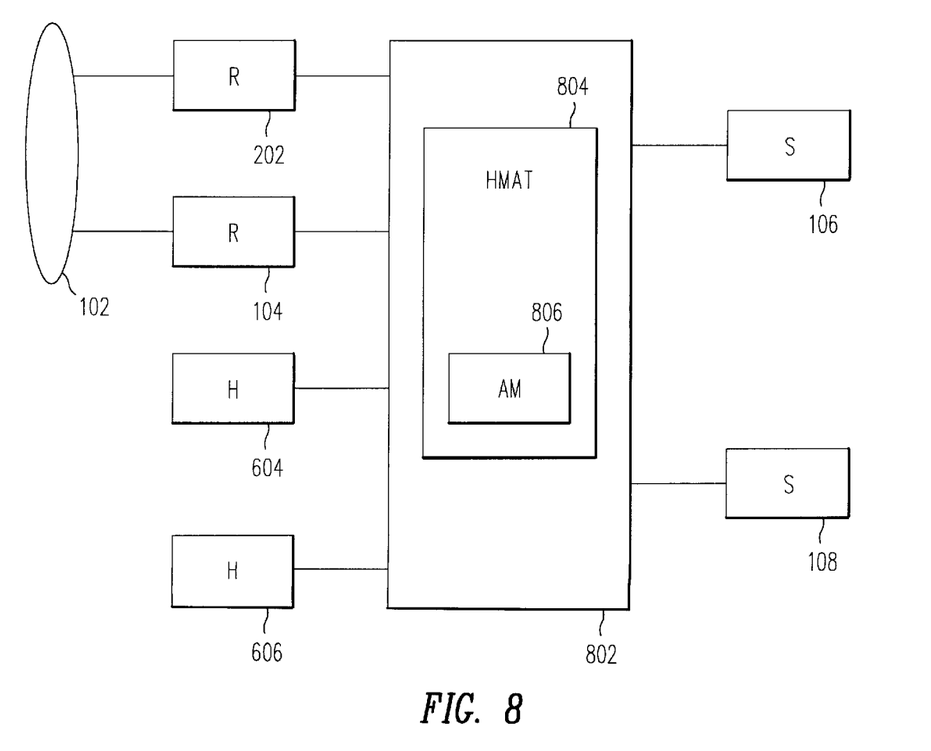
FIG. 8 is a block diagram of network having a switch circuit with a hardware MAC address translator, in accordance with one embodiment of the present invention.

FIG. 8 is a block diagram of network 800 having a flowswitch 802 with a hardware MAC address translator (HMAT) 804, according to one embodiment of the present invention. Network 800 is substantially similar to network 300 (FIG. 3), except that network 800 includes flowswitch 802 instead of flowswitch 302 as in network 300. In this embodiment, flowswitch 802 is implemented as described in the aforementioned Ser. No. 08/994,709 application, with the addition of HMAT 804. HMAT 804 can be implemented with an associative memory 806 such as, for example, a content addressable memory (CAM).

Figure 9A:
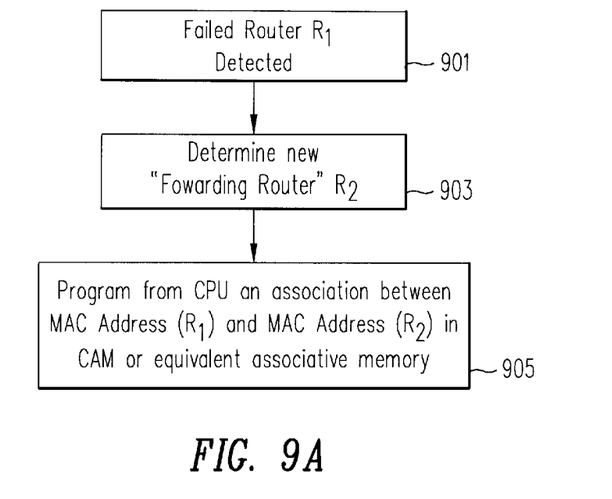
FIGS. 9A and 9B are flow diagrams illustrative of the operation of the switch circuit of FIG. 8 in translating a MAC address, in accordance with one embodiment of the present invention.

FIGS. 9A and 9B are flow diagrams illustrative of the operation of HMAT 804. Referring to FIGS. 8 and 9A, associative memory 806 is programmed as follows. In a step 901, flowswitch 802 detects a failed router as described above in conjunction with FIG. 4. In a next step 903, flowswitch 802 selects a new functional router to which outgoing traffic directed to the failed router is to be redirected, as described above in conjunction with FIG. 4. In a next step 905, flowswitch 802 programs associative memory 806 to store the MAC address of the selected functional router in association with the MAC address of the failed router. Consequently, as is well known in the art of associative memories, associative memory 806 will output the MAC address of the selected functional router when accessed using the address of the failed router.

Figure 9B:
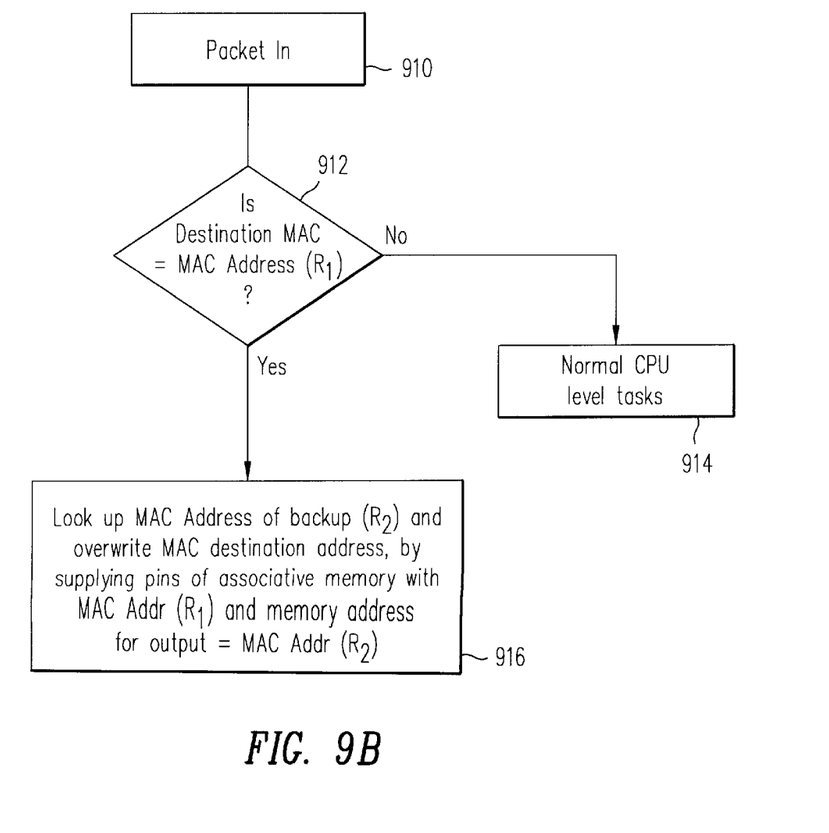

Referring to FIGS. 8 and 9B, flowswitch 802 redirects outgoing traffic (i.e., from servers 106 or 108 or hosts 604 or 606) originally intended for the failed router to the selected functional router as follows. In a step 910, flowswitch 802 receives a packet from servers 106 or 108 or hosts 604 or 606.

In a next step 912, the MAC address contained in the received packet is received on the address lines (not shown) of associative memory 806. If the received MAC address does not match the MAC address of the failed router (which is stored in associative memory 806), flowswitch 802 performs a step 914 in which the output address of associative memory 806 is disregarded and flowswitch 802 performs the normal tasks in directing the packet to the intended router as described in the aforementioned Ser. No. 08/994,709 application.

However, if the received MAC address does match the MAC address of the failed router, in a step 916 associative memory 806 outputs the MAC address of the selected functional router. The MAC address of the received packet (i.e., of the failed router) is then overwritten with the MAC address provided by associative memory 806 (i.e., of the selected functional router), resulting in the packet being forwarded to the selected functional router instead of the failed router. Because associative memory 806 is used in flowswitch 802, the MAC address translation is performed significantly faster than a typical software MAC address translation. In addition, the processor in flowswitch 802 is freed to perform other tasks while the hardware is performing the MAC address translation.

The embodiments of the networks described above are illustrative of the principles of this invention and are not intended to limit the invention to the particular embodiments described. For example, in light of the present disclosure, those skilled in the art of networking can implement other embodiments of the switch circuit using a crossbar switch without undue experimentation. Further, those skilled in the art can implement other embodiments of the switch circuit for local networks having more than two servers and routers. Accordingly, while the preferred embodiment of the invention has been illustrated and described, it will be appreciated that in view of the present disclosure, various changes can be made therein without departing from the spirit and scope of the invention.

I claim:

1. A method for providing router fault tolerance in a network, the network including a plurality of routers, at least one server and at least one network flowswitch, the method comprising:

detecting in the network flowswitch an occurrence of a failed router of the plurality of routers;

detecting in the network flowswitch a packet from the server directed to the failed router after the occurrence of a failed router is detected;

changing a media access control (MAC) address of the packet with a MAC address of a functional router of the plurality of routers when the packet is detected; and relaying the packet to the functional router after the MAC address is changed.

2. The method of claim 1 wherein the network comprises a plurality of servers.

3. The method of claim 2 wherein relaying the packet to the functional router comprises relaying the packet to the functional router over a media that is not shared with packets directed to other routers or servers.

4. The method of claim 1 wherein said detecting an occurrence of a failed router comprises monitoring Internet Control Message Protocol (ICMP) Router Discovery Protocol (RDP) advertisements from the plurality of routers, wherein an absence of an ICMP RDP advertisement from a particular router of the plurality of routers is indicative of a failure of the particular router.

5. The method of claim 1 wherein said detecting an occurrence of a failed router comprises sending at least one Address Resolution Protocol (ARP) request to each router of the plurality of routers, wherein an absence of a reply to an ARP request from a particular router of the plurality of routers is indicative of a failure of the particular router.

6. The method of claim 1 further comprising:
detecting an address resolution protocol (ARP) request from the server to the failed router; and
responding to the ARP request with the MAC address of the functional router, whereby the server is configured to send subsequent outbound packets with the MAC address of the functional router.

7. The method of claim 1 wherein said detecting an occurrence of a failed router comprises monitoring Open Shortest Path First (OSPF) "Hello" packets sent by each router of the plurality of routers to learn an interval between successive OSPF "Hello" packets for each router of the plurality of routers, wherein an absence of an OSPF "Hello" request from a particular router of the plurality of routers during the learnt interval is indicative of a failure of the particular router.

8. The method of claim 1 further comprising:
detecting a recovery of the failed router, the failed router becoming a recovered router; and
terminating said detecting a packet from the server directed to the failed router when said failed router recovers.

9. The method of claim 8 further comprising waiting for a time out period to expire after said detecting when the failed router recovers.

10. The method of claim 9 wherein the time out period is greater than or equal to a time period needed for the recovered router to learn routes to all known clients.

11. The method of claim 8 wherein said detecting a recovery of the failed router comprises monitoring ICMP RDP advertisements from the plurality of routers, wherein an occurrence of an ICMP RDP advertisement from the failed router is indicative of a recovery of the failed router.

12. The method of claim 8 wherein said detecting a recovery of the failed router comprises detecting an occurrence of an OSPF "Hello" packet from the failed router, the OSPF "Hello" packet being indicative of a recovery of the failed router.

13. The method of claim 8 wherein said detecting a recovery of the failed router comprises sending ARP requests to each router of the plurality of routers, wherein an occurrence of a reply to an ARP request from the failed router is indicative of a recovery of the failed router.

14. The method of claim 1 wherein packets are transferred between the server and a router of the plurality of routers through a switch circuit.

15. The method of claim 14 wherein the switch circuit comprises a switched Ethernet circuit.

16. An apparatus for providing router fault tolerance in a network, the network including a plurality of routers, at least one server and at least one network flowswitch, the apparatus comprising:
means for detecting an occurrence of a failed router in the plurality of routers;
means for detecting a packet from the server directed to the failed router after the failed router is detected;
means for changing a media access control (MAC) address of the packet with a MAC address of a functional router of the plurality of routers when the packet is detected; and
means for relaying the packet to the functional router after the MAC address is changed.

17. The apparatus of claim 16 further comprising:
means for detecting an address resolution protocol (ARP) request from the server to the failed router; and
means for responding to the ARP request with the MAC address of the functional router, wherein the server sends subsequent outbound packets with the MAC address of the functional router.

18. The apparatus of claim 16 wherein said means for detecting a failed router comprises means for monitoring Internet Control Message Protocol (ICMP) Router Discovery Protocol (RDP) advertisements from the plurality of routers, wherein an absence of an ICMP RDP advertisement from a particular router of the plurality of routers is indicative of a failure of the particular router.

19. The apparatus of claim 16 wherein said means for detecting a failed router comprises means for sending ARP requests to each router of the plurality of routers, wherein an absence of a reply to an ARP request from a particular router of the plurality of routers is indicative of a failure of the particular router.

20. The apparatus of claim 16 further comprising:
means for detecting a recovery of the failed router, the failed router becoming a recovered router; and
means for disabling said means for detecting a packet from the server directed to the failed router when said failed router recovers.

21. The apparatus of claim 20 wherein said means for detecting a recovery of the failed router comprises means for monitoring ICMP RDP advertisements from the plurality of routers, wherein an occurrence of an ICMP RDP advertisement from the failed router is indicative of recovery of the failed router.

22. The apparatus of claim 20 wherein said means for detecting a recovery of the failed router comprises means for sending ARP requests to each router of the plurality of routers, wherein an occurrence of a reply to an ARP request from the failed router is indicative of a recovery of the failed router.

23. A network having router fault tolerance, the network configured to be coupled to a network backbone, the network comprising:
a switch circuit;
a first router coupled to said switch circuit and the network backbone, said first router having a media access control (MAC) address;
a second router coupled to said switch circuit and the network backbone, said second router having a MAC address; and
a server coupled to the switch circuit,
wherein the switch circuit is configured to detect when the first router fails, the switch circuit being further configured to monitor packets sent by the server to the first router and to change in the packet the MAC address of the first router to the MAC address of the second router.

24. The network of claim 23 further comprising a plurality of servers, the plurality of servers including the server.

25. The network of claim 23 wherein the switch circuit is further configured to relay the packet to the second router after changing the MAC address of the first router to the MAC address of the second router.

26. The network of claim 23 wherein the switch circuit is configured to detect a failed router by monitoring Internet Control Message Protocol (ICMP) Router Discovery Protocol (RDP) advertisements from the first and second routers, wherein an absence of an ICMP RDP advertisement from a particular router of the first and second routers is indicative of a failure of the particular router.

27. The network of claim 23 wherein the switch circuit is configured to detect a failed router by sending ARP requests to the first and second routers, wherein an absence of a reply to an ARP request from a particular router of the first and second of routers is indicative of a failure of the particular router.

28. The network of claim 23 wherein the switch circuit is configured to detect a failed router by sending ICMP echo requests to the first and second routers, wherein an absence of a reply to an ICMP echo request from a particular router of the first and second of routers is indicative of a failure of the particular router.

29. The network of claim 23 wherein the switch circuit is configured to detect a failed router by monitoring packets from the routers for Open Shortest Path First (OSPF) "Hello" packets sent by each router of the plurality of routers to learn an interval between successive OSPF "Hello" packets for each router of the plurality of routers, wherein an absence of an OSPF "Hello" request from a particular router of the plurality of routers during the learnt interval is indicative of a failure of the particular router.

30. The network of claim 23 wherein the switch circuit is further configured to:

detect an address resolution protocol (ARP) request from the server to the first router; and respond to the ARP request with the MAC address of the second router, whereby the server sends subsequent outbound packets with the MAC address of the second router.

31. The network of claim 23 wherein the switch circuit is further configured to:

detect when the first router recovers; and terminate monitoring for packets sent by the server to the first router after the first router recovers.

32. The network of claim 31 wherein the switch circuit is further configured to wait for a time-out period to expire after detecting when the first router recovers.

33. The network of claim 32 wherein the time-out period is greater than or equal to a time period needed for the recovered first router to learn routes to all known clients.

34. The network of claim 31 wherein the switch circuit is configured to detect a recovery of the failed router by monitoring ICMP RDP advertisements from the first and second routers, wherein an occurrence of an ICMP RDP advertisement from the failed router is indicative of a recovery of the failed router.

35. The network of claim 31 wherein the switch circuit is configured to detect a recovery of the failed router by sending ARP requests to the first and second routers, wherein an occurrence of a reply to an ARP request from the failed router is indicative of a recovery of the failed router.

36. The network of claim 31 wherein the switch circuit is configured to detect a recovery of the failed router by sending ICMP echo requests to the first and second routers, wherein an occurrence of a reply to an ICMP echo request from the failed router is indicative of a recovery of the failed router.

37. The network of claim 23 wherein packets are transferred between the server and the first router through the switch circuit and between the server and the second router through the switch circuit.

38. The network of claim 36 wherein the switch circuit is configured to provide full duplex communication between the first router and the server.

39. The network of claim 36 wherein the switch circuit comprises a switched Ethernet circuit.

* * * * *